March 6, 1951 C. H. BAUER 2,544,004
HEIGHT GAUGE FIXTURE
Filed June 20, 1946 2 Sheets-Sheet 1
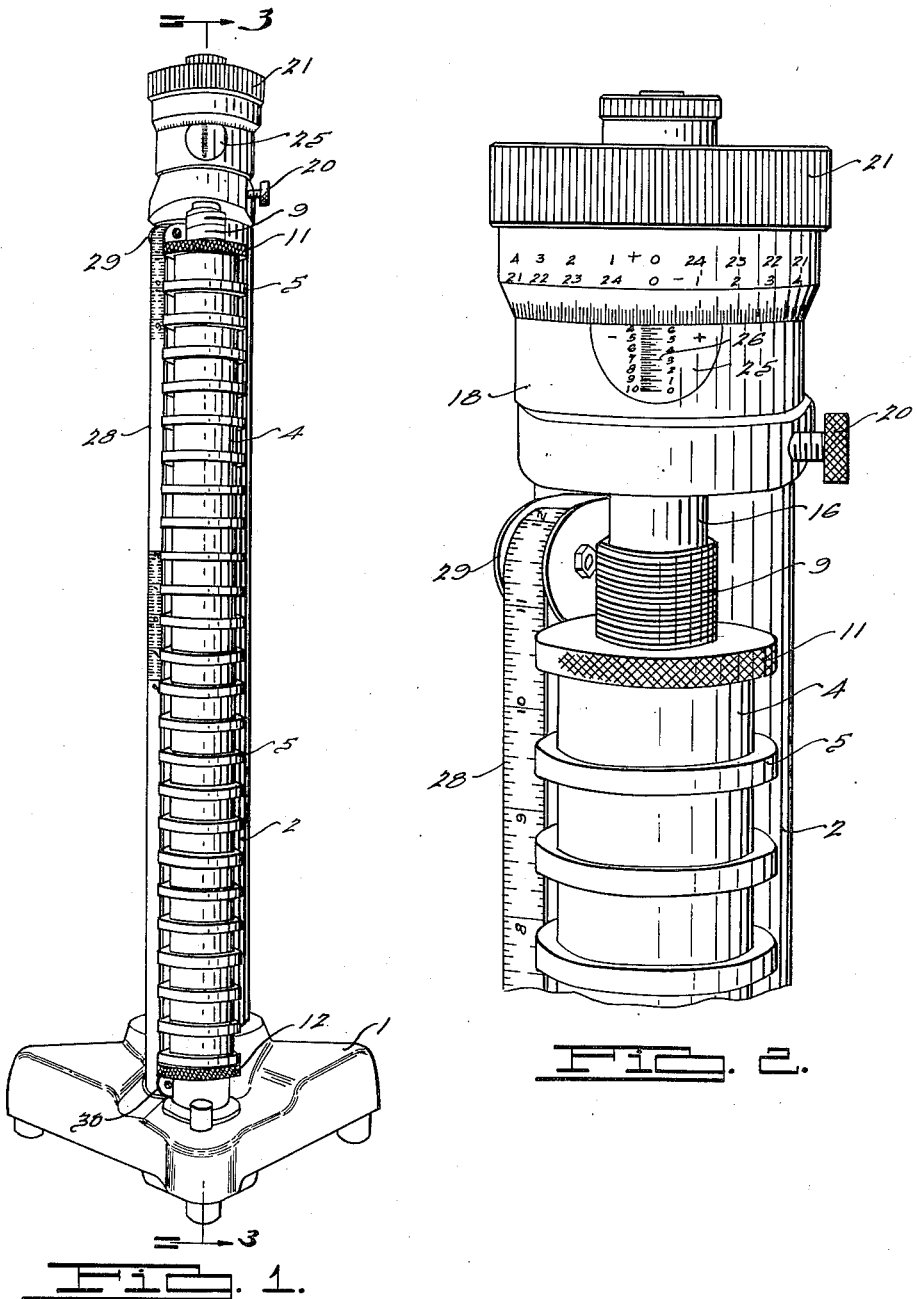
INVENTOR.
Clarence H. Bauer.
BY
Harness, Dickey & Pierce.
ATTORNEYS.

March 6, 1951 C. H. BAUER 2,544,004
HEIGHT GAUGE FIXTURE
Filed June 20, 1946 2 Sheets-Sheet 2
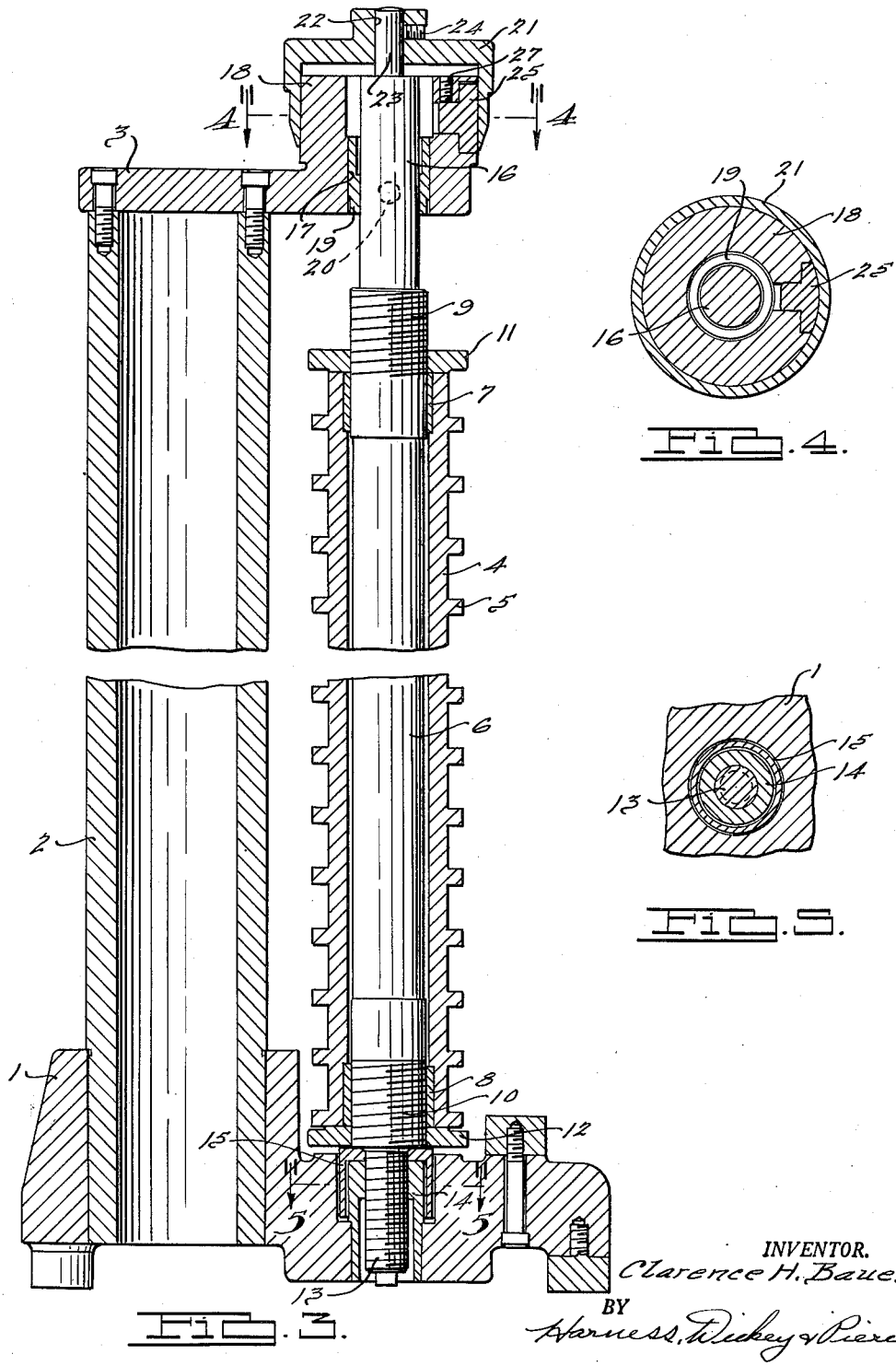
INVENTOR.
Clarence H. Bauer.
BY
Harness, Dickey & Pierce.
ATTORNEYS.

Patented Mar. 6, 1951

2,544,004

UNITED STATES PATENT OFFICE 2,544,004

HEIGHT GAUGE FIXTURE

Clarence H. Bauer, Detroit, Mich., assignor to Cadillac Gage Company, Detroit, Mich., a partnership Application June 20, 1946, Serial No. 677,999

7 Claims. (Cl. 33—170)

The present invention relates to height gage fixtures and particularly relates to improvements over the type of fixture disclosed and claimed in the co-pending application of Russel E. Bauer, Serial No. 560,977, filed October 30, 1944 and issued May 4, 1948 as Patent 2,440,710.

The primary object of the present invention is to provide improvements in height gages of the type mentioned in which any reference line may be directly picked up and measurements may then be taken directly to either side of the reference line.

A further object of the invention is to provide improvements in height gage fixtures of the type mentioned which are extremely accurate and which may be used to make direct measurements without the necessity for calculation.

Other objects of the invention will become apparent from the following specification, the drawings relating thereto, and from the claims hereinafter set forth.

In the drawings, in which like numerals are used to designate like parts, in the several views throughout;

Figure 1 is a front perspective view of a height gage fixture embodying features of the present invention;

Figure 2 is an enlarged partial view of the upper end of the height gage fixture shown in Figure 1;

Figure 3 is a broken, vertical cross-sectional view taken substantially along the line 3—3 of Figure 1;

Figure 4 is a cross-sectional view taken substantially along the line 4—4 of Figure 3; and Figure 5 is a cross-sectional view taken substantially along the line 5—5 of Figure 3.

The fixture of the present invention is adapted to be positioned on the top of a surface plate, or similar surface, and the work piece to be measured is mounted on or adjacent the plate so that the height gage fixture is also disposed adjacent the work piece. A height gage, which may be of conventional construction, is also placed upon the surface in the usual way. The height gage may be of the type having a laterally projecting finger mounted for vertical adjustment so that the finger and the measuring surfaces on the height gage fixture of the present invention may be brought into contact to either set the height gage fixture for the reference point or to measure the distance from the reference point.

The fixture of the present invention comprises a standard having a base 1 upon which a vertical column 2 is fixedly mounted. A thimble bracket 3 having a horizontal projecting portion is fixed to the upper end of the column 2.

A tubular measuring bar 4 is mounted on the standard, in a manner that will be described in detail hereinafter, and is circular in cross section. The measuring bar 4 has a plurality of integral, flat, annular projections 5 formed thereon with the top surfaces thereof parallel and at precisely-spaced intervals. Such intervals are equal and may be, for example, 1" apart. The measuring bar 4 is mounted on a bar 6 which is coaxial with the bar 4 and projects through the opposite ends thereof. Spacer bushings 7 and 8 are received within the ends of the bar 4 and set against annular shoulders formed therein and serve to space the bar 4 from the bar 6 and permit relative movement between bars 4 and 6 along the longitudinal axis thereof.

The bar 6 is threaded adjacent the opposite ends of the bar 4 as indicated at 9 and 10. Nuts 11 and 12 threadably engage the threaded portions 9 and 10, respectively, and engage the adjacent ends of the bar 4. By properly positioning the nuts 11 and 12 on their respective threaded portions, the measuring bar 4 may be moved longitudinally with respect to the bar 6 and fixed in the desired longitudinal position with respect to the bar 6. The threaded portions 9 and 10 are of a length slightly to exceed the distance between the measuring surfaces on the bar 4 so that enough longitudinal movement of the bar 4 is permitted to bring one of the measuring surfaces to the exact position of the reference line.

The lower end of bar 6 is reduced and has a lead screw or thread 13 formed thereon which is threadably received within a threaded opening in a lead nut 14. The lead nut 14 is fixedly mounted within a vertical opening in the base 1. A dust shield in the form of an inverted cup 15 having a central opening therethrough embraces the threaded portion 13 and is telescopically received over the upper end of the nut 14.

The upper end of the bar 6 has a reduced diameter as indicated at 16 and extends upwardly through an opening 17 formed in an upwardly projecting tubular portion 18 of the thimble bracket 3. A bushing 19 is received within the opening 17 and has a central opening therethrough, the surface of which supports and aligns the portion 16 of the bar 6. The bushing 19 may be held in place within opening 17 by means of a set screw 20 which is received within a tapered opening in tubular portion 18 and which is adapted to engage the upper end of bar 6 to hold it in its set position.

Cap or thimble 21 is telescopically received over the peripheral surface of portion 18 and has an axial opening 22 therethrough through which a further reduced portion 23 of the bar 6 extends. The thimble is fixed to the bar 6 for rotation therewith by means of a set screw 24 which engages the reduced portion 23.

An adjustable insert 25, which may be of the type disclosed in the co-pending application of Russel E. Bauer, Serial No. 560,976, filed October 30, 1944, issued as Patent 2,440,710, is positioned within an opening in member 18 on the front face thereof. The insert 25 has a scale 26 marked thereon, the scale 26 being 1" in length, for example, with suitable division indicia marked thereon, and with the plus and minus indications disposed on opposite sides of the scale line and extending numerically in opposite directions. The insert may be adjustably positioned by means of a set screw 27 and is set to adjust for errors in the lead screw 13.

The lower peripheral edge of the thimble 21 is preferably inwardly tapered with a peripheral scale therearound and with the lower edge thereof perfectly flat or in a plane normal to the longitudinal axis of bars 4 and 6, so that the thimble 21 is rotated, the position of the scale on the lower edge of the thimble with respect to the scale 26 will indicate the scale reading either above or below zero. As indicated, both plus and minus indicia are on the thimble 21 with the numerals for such plus and minus readings extending in opposite directions therearound.

By rotation of the thimble 21, both bars 4 and 6 are bodily moved along their common longitudinal axis through the action of the lead screw 13 and nut 14 to indicate the extent of movement of all of the projections with respect to the surface plate or any other reference line with respect to one of the projecting surfaces.

A flexible scale 28 in the form of a continuous loop is mounted upon rollers 29 and 30 which are rotatably mounted on the standard adjacent the top and bottom, respectively, of the measuring bar 4. The scale has a zero line with the scale markings extending numerically in opposite directions therefrom so that readings either above or below the reference line may be conveniently taken.

In the use of the device above described, the work piece and height gage are supported on the surface plate or machine in the usual way. The bar 4 is then axially moved with respect to the bar 6 so that the surface of the closest projection 5 is exactly located on the reference line. It is then fixed with respect to the bar 6 with the thimble 21 on zero setting with respect to scale 26. The flexible scale 28 is then moved so that the zero line thereon is adjacent the particular surface of projection 5 for the reference line. Accurate measurements may then be directly made on either side of the reference line by using the closest inch projection 5 and by turning the thimble 21 to bodily move the measureing surface on the bar 4 to the exact frictional measurement either in a plus or minus direction, as the case may be.

Formal changes may be made in the specific embodiment above described without departing from the invention, the scope of which is commensurate with the appended claims.

I claim:

1. A height gage fixture comprising a standard, a bar having a plurality of parallel, flat surfaces formed thereon at precisely spaced intervals therealong, another bar, means interconnecting said first and second named bars for relative axial movement with respect to each other, means mounting said second named bar on said standard for movement of both of said bars with respect to said standard along the longitudinal axis of said bars, and means indicating the extent of said last named axial movement.

2. A height gage fixture comprising a standard, a bar having a plurality of parallel, flat surfaces formed thereon at precisely spaced intervals therealong, another bar, means interconnecting said first and second named bars for relative axial movement with respect to each other and for bodily movement together, means mounting said second named bar on said standard for movement of both of said bars with respect to said standard along the longitudinal axis of said bars, and means indicating the extent of said last named axial movement.

3. A height gage fixture comprising a standard, a bar having a plurality of parallel, flat surfaces formed thereon at precisely spaced intervals therealong, another bar coaxial with respect to said first bar, means interconnecting said first and second named bars for relative axial movement with respect to each other, means mounting said second named bar on said standard for movement of both of said bars with respect to said standard along the longitudinal axis of said bars, and means indicating the extent of said last named axial movement.

4. A height gage fixture comprising a standard, a bar having a plurality of parallel, flat, annularly projecting surfaces formed thereon at precisely spaced intervals therealong, another bar coaxial with respect to said first bar, means interconnecting said first and second named bars for relative axial movement with respect to each other, means mounting said second named bar on said standard for movement of both of said bars with respect to said standard along the longitudinal axis of said bars, and means indicating the extent of said last named axial movement.

5. A height gage fixture comprising a standard, a tubular member having a plurality of parallel, flat, annularly projecting surfaces formed thereon at precisely spaced intervals therealong, a bar coaxially disposed within said tubular member, means threadably interconnecting said tubular member and said bar for relative axial movement with respect to each other, means mounting said bar on said standard for movement of said bar and said tubular member with respect to said standard along the longitudinal axis of said bar, and means indicating the extent of said last named axial movement.

6. A height gage fixture comprising a standard, a tubular member having a plurality of parallel, flat, annularly projecting surfaces formed thereon at precisely spaced intervals therealong, a bar coaxially disposed within said tubular member, means threadably interconnecting said tubular member and said bar for relative axial movement with respect to each other, means adjustably fixing said tubular member on said bar for bodily movement therewith, means mounting said bar on said standard for movement of said bar and said tubular member with respect to said standard along the longitudinal axis of said bar, and means indicating the extent of said last named axial movement.

7. A height gage fixture comprising a standard, a tubular member having a plurality of parallel, flat annularly projecting surfaces formed thereon at precisely spaced intervals therealong, a bar coaxially disposed within said tubular member, means threadably interconnecting said tubular member and said bar for relative axial movement with respect to each other, means mounting said bar on said standard for movement of said bar and said tubular member with respect to said standard along the longitudinal axis of said bar, means indicating the extent of said last named axial movement, a scale, and means movably mounting said scale on said standard adjacent said surfaces for movement parallel to the longitudinal axis of said bar.

CLARENCE H. BAUER.

REFERENCES CITED

The following references are of record in the file of this patent:

UNITED STATES PATENTS

| Number | Name | Date |
|---|---|---|
| 1,602,490 | Homan | Oct. 12, 1926 |
| 2,135,316 | Whistler et al. | Nov. 1, 1938 |
| 2,200,884 | Hoagland | May 14, 1940 |
| 2,440,710 | Bauer | May 4, 1948 |

FOREIGN PATENTS

| Number | Country | Date |
|---|---|---|
| 438,807 | Germany | Dec. 28, 1926 |